(12) United States Patent
Alfermann et al.

(10) Patent No.: US 7,937,823 B2
(45) Date of Patent: May 10, 2011

(54) METHOD FOR PRODUCING A STATOR ASSEMBLY

(75) Inventors: Timothy J. Alfermann, Noblesville, IN (US); Ahmed M. El-Antably, Indianapolis, IN (US); Arthur L. Mc Grew, Jr., Plainfield, IN (US); Charles B. Lucas, Indianapolis, IN (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1016 days.

(21) Appl. No.: 11/737,220

(22) Filed: Apr. 19, 2007

(65) Prior Publication Data

US 2008/0256783 A1    Oct. 23, 2008

(51) Int. Cl.
*H02K 15/02*    (2006.01)
(52) U.S. Cl. .................. 29/596; 29/732; 310/216.008; 310/216.114
(58) Field of Classification Search .................. 29/596, 29/732; 310/216.008, 216.009, 216.109, 310/216.114, 89, 88, 86, 87
See application file for complete search history.

(56) References Cited

U.S. PATENT DOCUMENTS 6,166,467 A * 12/2000 Tsai et al. .................. 310/89

FOREIGN PATENT DOCUMENTS

JP    2001161039 A * 6/2001

* cited by examiner

*Primary Examiner* — A. Dexter Tugbang
*Assistant Examiner* — Livius R Cazan
(74) *Attorney, Agent, or Firm* — Quinn Law Group, PLLC

(57) ABSTRACT

The present invention provides a method for producing a stator assembly. The method initially includes providing an assembly mandrel having a generally cylindrical hub and a generally annular base circumscribing a terminal end portion of the hub. A first end ring and a stator shell are installed around the mandrel hub and onto the mandrel base. Thereafter, a plurality of poles are disposed on top of the first end ring and in a generally cylindrical pattern between the stator shell and the mandrel hub. A second end ring is disposed around the mandrel hub and on top of the plurality of poles. A plurality of stator shell tabs may then be bent in a radially inward direction to axially retain the first and second end rings.

10 Claims, 4 Drawing Sheets

US 7,937,823 B2

METHOD FOR PRODUCING A STATOR ASSEMBLY

GOVERNMENT LICENSE RIGHTS

The U.S. Government has a paid-up license in this invention and the right in limited circumstances to require the patent owner to license others on reasonable terms as provided for by the terms of ZCL-3-32060-02 awarded by NREL/DOE.

TECHNICAL FIELD

The present invention relates generally to a method for producing a stator assembly.

BACKGROUND OF THE INVENTION

Electric devices such as motors and generators having a stator secured within a housing of the motor/generator are well known. A rotor mounted on a shaft is coaxially positioned within the stator and is rotatable relative to the stator about the longitudinal axis of the shaft. The passage of current through the stator creates a magnetic field tending to rotate the rotor and shaft. It is also well known that it is necessary to maintain the stator within a predefined temperature range and to keep the stator free of contaminants in order to ensure optimal performance and reliability of the motor/generator.

Two primary changes can be made to the stator that will increase the torque density or the torque per unit weight of the motor/generator. One primary change is to increase the number of stator windings. The greater the slot fill factor, or percent of the motor/generator's volume that is occupied by windings, the greater the motor's torque will be. Increasing a motor/generator's slot fill factor will also increase the efficiency of the device. This method for improving torque, however, is physically limited by the shape and size of the stator. The other primary change employed to increase the motor's torque density involves increasing the amount of current that flows through the stator windings. Increases in current flowing through the stator windings cause increases in stator heating due to resistive or ohmic heating.

One application of the electric motor/generator described hereinabove is the hybrid electric vehicle. Hybrid electric vehicles offer potential improvements in fuel economy and reductions in tailpipe emissions. A hybrid electric vehicle incorporates a traditional internal combustion engine combined with an electromechanical hybrid transmission having one or more electric motor/generators arranged in series or parallel and gearing arrangements such as planetary gear sets. The electric motor/generators assist in propulsion or energy absorption (storage) depending on the mode of operation. As with any energy conversion device, the motor/generators are less than 100 percent efficient, and reject some energy as heat. Efficient removal of this waste heat is required in order to achieve a highly efficient operating mode of the hybrid electric vehicle.

SUMMARY OF THE INVENTION

The present invention provides a method for producing a stator assembly. The method initially includes providing an assembly mandrel having a generally cylindrical hub and a generally annular base circumscribing a terminal end portion of the hub. A first end ring and a stator shell are installed around the mandrel hub and onto the mandrel base. Thereafter, a plurality of poles are disposed on top of the first end ring and in a generally cylindrical pattern between the stator shell and the mandrel hub. A second end ring is disposed around the mandrel hub and on top of the plurality of poles. A plurality of stator shell tabs may then be bent in a radially inward direction to axially retain the first and second end rings.

The present invention may also include disposing a gasket around the mandrel hub and on top of the first end ring before installing the stator shell, wherein the gasket is configured to seal the interface between the first end ring and the plurality of poles.

The present invention may also include disposing a plurality of retainers between the plurality of poles before installing the second end ring, wherein the plurality of retainers are configured to seal the gap radially defined between adjacent poles.

The plurality of poles may be pre-assembled by attaching or assembling a plurality of pole components together and wrapping the assembled pole components with a wire to form a coil.

The coils of the pre-assembled poles may be coated with either epoxy or varnish.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
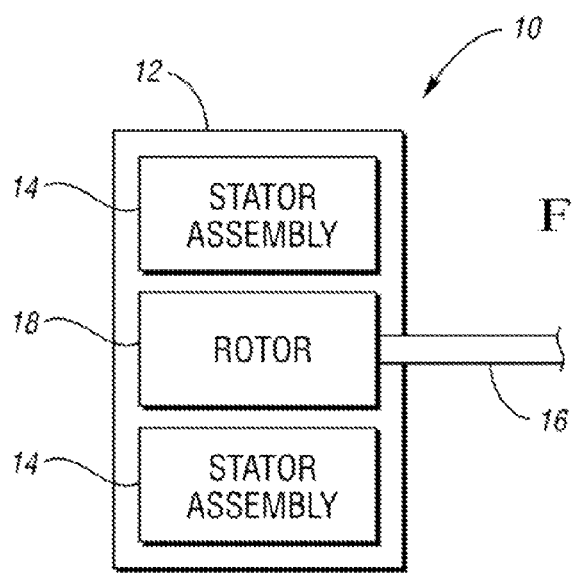
FIG. 1 is a schematic cross-sectional diagram of an electric motor including a stator assembly in accordance with the present invention.

Referring to the drawings wherein like reference numbers represent the same or similar components throughout the several figures, there is shown in FIG. 1 a schematic representation of an electric motor 10. The electric motor 10 is shown for illustrative purposes in accordance with the preferred embodiment; however it should be appreciated the method of the present invention may be adapted to produce alternate electric motor configurations and other electrical devices such as, for example, a generator. The electric motor 10 includes a housing 12, a stator assembly 14, a shaft 16, and a rotor 18. The stator assembly 14 is substantially annular and is configured to remain stationary relative to the housing 12 during operation of the motor 10. The rotor 18 is fixed to the shaft 16 for unitary rotation therewith and is generally circumscribed by the stator 14. The rotor 18 and shaft 16 are rotatable relative to the housing 12 and the stator 14.

Figure 2:
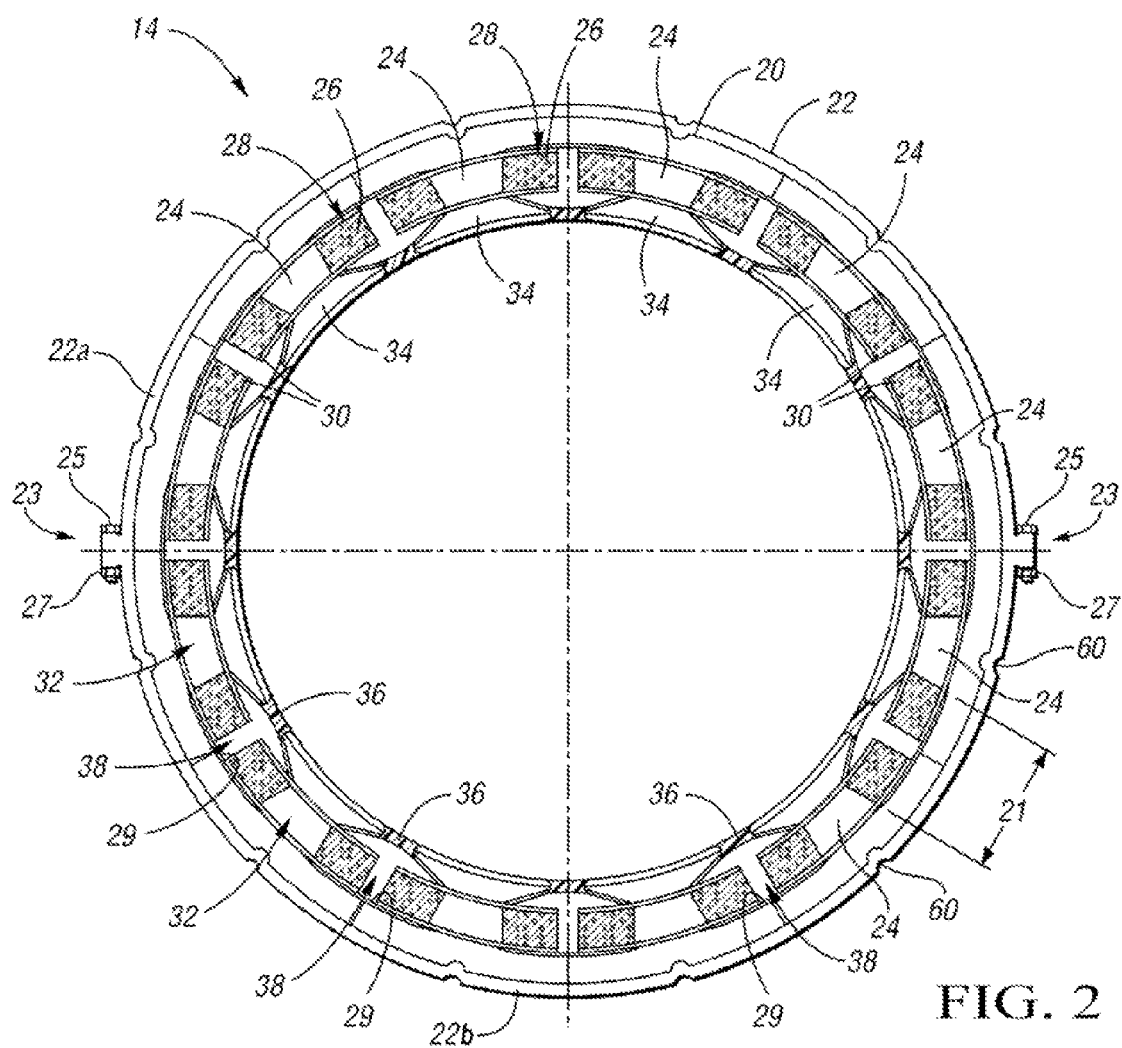
FIG. 2 is a sectional view of the stator assembly of FIG. 1.

Referring to FIG. 2, the stator assembly 14 preferably includes a stator core 20 contained within a stator sleeve or shell 22. A plurality of stator teeth 24 extend radially inward from the stator core 20 forming slots 21 therebetween. A stator wire 26 is wound or wrapped around each of the stator teeth 24 to at least partially fill the slots 21 and form a stator coil 28. The stator coil 28 may be impregnated with epoxy resin 30 such that the stator wire 26, forming the windings of the stator coil 28, are electrically isolated from each other. An epoxy resin type 66-2251 commercially available from Wabash Magnetics LLC., located at 1450 First Street, Wabash, Ind. 46992, is preferably implemented for the epoxy resin 30.

According to a preferred embodiment, the stator core 20 is composed of a soft magnetic composite (SMC) to reduce cost and simplify manufacturing, and the stator wire 26 is composed of copper. According to an alternate embodiment, the stator core 20 may be composed of steel laminations. The addition of the epoxy resin 30 in the manner described hereinabove increases the strength of the stator assembly 14 and provides additional damping. This increase in strength of the stator assembly 14 is particularly advantageous for the preferred embodiment wherein the stator core 20 is composed of a soft magnetic composite. The damping characteristics of the epoxy resin 30 allows for the absorption of vibrations generated by the electric motor 10 that may otherwise be objectionable thereby providing smoother operation. It should be appreciated; however, that alternate epoxy resin, stator core and/or stator wire compositions may be envisioned. Additionally, a varnish may be used in lieu of the epoxy resin 30 while remaining within the scope of that which is claimed.

With continued reference to FIG. 2, each stator tooth 24 and stator coil 28 will hereinafter be referred to as a "pole" 32. Each pole 32 is preferably wound separately to maximize the number of windings within a given slot volume, sometimes referred to as slot fill, thereby optimizing the performance of the electric motor 10 (shown in FIG. 1). The stator 14, as shown, includes twelve poles 32; however, those skilled in the art will recognize that more or fewer poles 32 may be provided while remaining within the scope of that which is claimed. The twelve poles 32 are held in relation to one another by the shell 22 via the engagement of the ridges 60 and grooves 64 (shown in FIG. 4), and the respective stator coils 28 are electrically interconnected such that current is transferable between poles 32. The stator teeth 24 each terminate in a flanged end portion 34. The flanged end portions 34 of adjacent poles 32 cooperate to retain an axially extending retainer 36 that extends substantially the entire axial length of the stator 14. Preferably, the retainers 36 are formed from a non-metallic material. The retainers 36, the stator coils 28 and the inner wall 29 of the stator core 20 cooperate to define a plurality of axially extending pathways or cooling channels 38 through which cooling fluid may circulate. In the preferred embodiment, oil (not shown) is circulated through the cooling channels 38 to absorb heat generated by the stator 14 and thereby cool the electric motor 10 (shown in FIG. 1). As the stator coils 28 are a primary source of heat, the proximity of the cooling channels 38 operate to efficiently cool the electric motor 10. Those skilled in the art will recognize that the cooling channels 38 could be radially delimited by a generally annular, axially extending sleeve or epoxy in lieu of the retainers 36.

The epoxy resin 30 has good thermal conduction properties and therefore enhances the thermal conductivity between the stator coils 28 and the oil (not shown). Accordingly, the thermal conduction of the epoxy resin 30 facilitates the process of transferring heat from the stator coils 28 to cool the electric motor 10 (shown in FIG. 1). The epoxy resin 30 also acts as an electrical isolator to prevent each of the individual windings of the stator coils 28 from forming an electrical connection therebetween and/or with the stator core 20 and thereby short-circuiting the electric motor 10.

As best shown in FIG. 2, the shell 22 is preferably composed of an upper half 22a, and a lower half 22b. The upper and lower halves 22a, 22b come together to define a flanged portion 23 protruding in a radially outward direction. The flange portion 23 is adapted to engage a complementary feature (not shown) of the housing 12 (shown in FIG. 1) and thereby resist rotation of the stator assembly 14 relative to the housing 12. A plurality of fasteners such as the screws 25 are preferably disposed through the flange portion 23 and retained by a corresponding plurality of nuts 27 such that the fasteners retain the upper and lower halves 22a, 22b of the shell 22. Additionally, by tightening the screws 25, the diameter of the shell 22 can be reduced such that a compressive force is applied to retain the components of the stator assembly 14.

Figure 3:
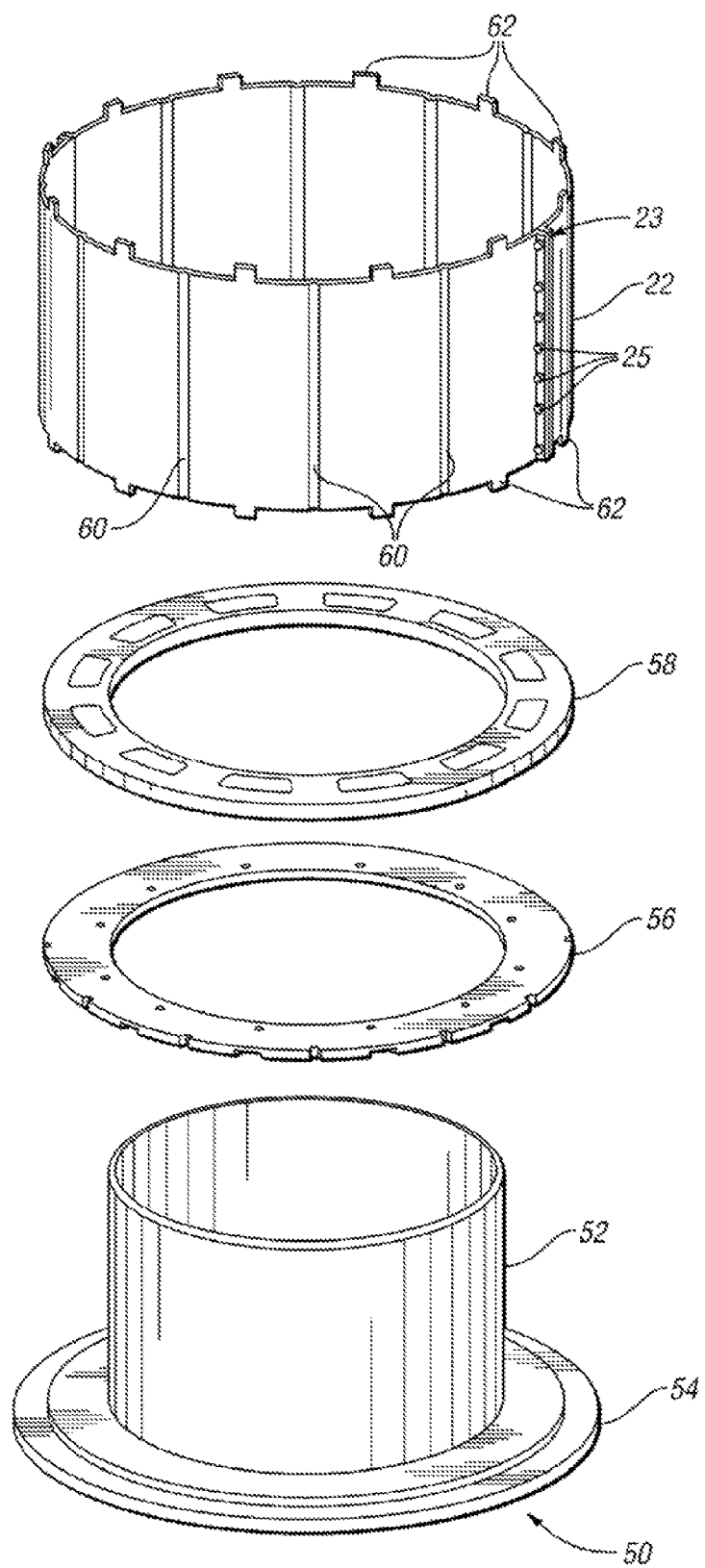
FIG. 3 is an exploded view illustrating a first sequence of steps in accordance with a method for producing the stator assembly of FIG. 2.
Figure 4:
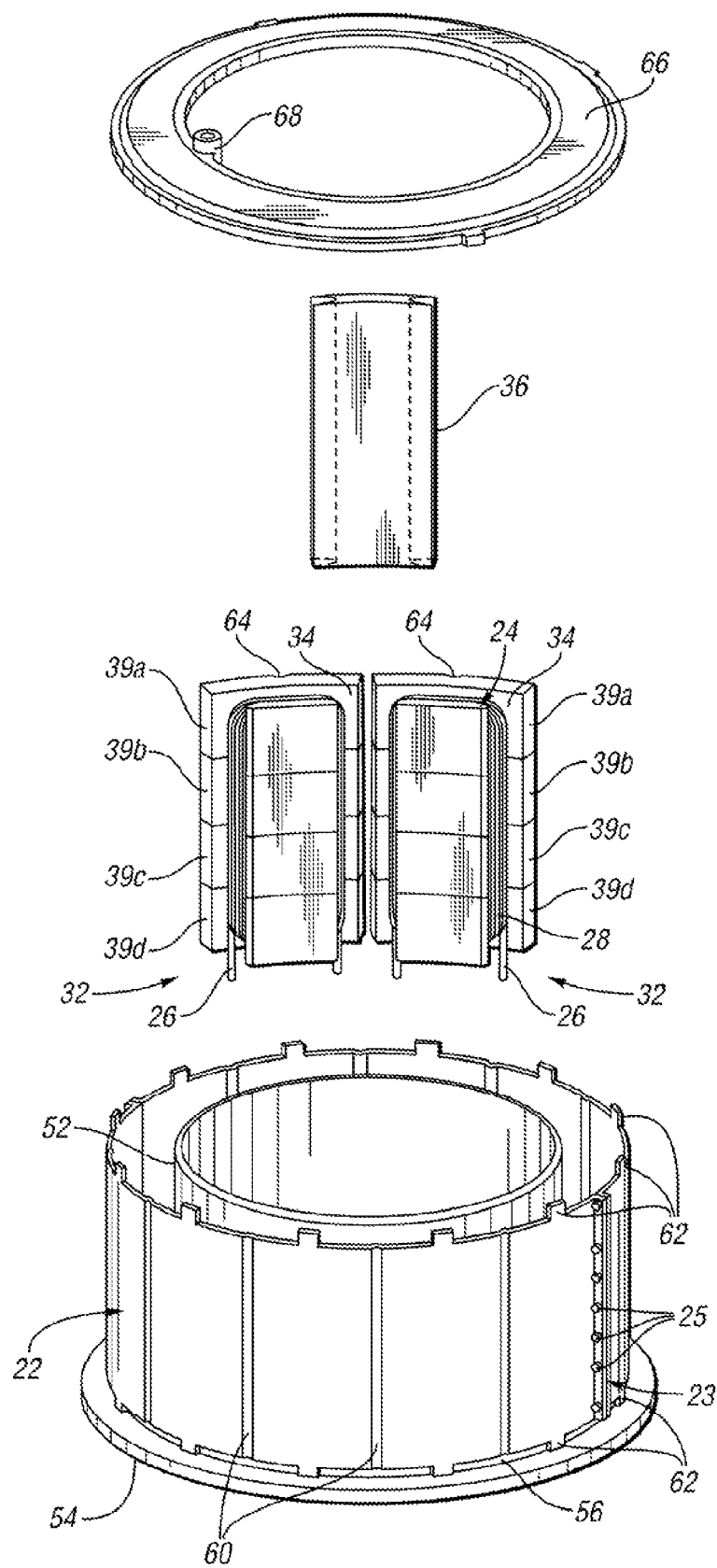
FIG. 4 is an exploded view illustrating a second sequence of steps in accordance with a method for producing the stator assembly of FIG. 2.

With reference to FIGS. 3-4, the preferred method for producing a stator assembly will now be described. The method of the present invention will hereinafter be described as producing the stator assembly 14 for exemplary purposes; however, it should be appreciated that this method may also be implemented to produce alternate stator assembly configurations.

Referring to FIG. 3, an exploded view illustrates a first sequence of steps performed during the production of the stator assembly 14 (shown in FIG. 2). An assembly mandrel 50 defining a generally cylindrical hub 52 and a generally annular base 54 circumscribing a terminal end portion of the hub 52 is provided to facilitate the process of manufacturing the stator assembly 14.

A first end ring 56 is initially placed around the hub 52 and onto the base 54 of the assembly mandrel 50. Thereafter, a gasket 58 and the shell 22 are placed onto the assembly mandrel 50 such that the gasket 58 is disposed axially between the first end ring 56 and the shell 22. The gasket 58 is optional but is preferably implemented to better seal the interface between the first end ring 56 and the stator core 20 (shown in FIG. 2). The shell 22 includes a plurality of axially defined ridges 60 configured to locate and retain the stator core 20 as will be described in detail hereinafter. The shell 22 also preferably includes a plurality of tabs 62 which are bent in a radially inward direction after the stator assembly 14 (shown in FIG. 2) is complete in order to retain the stator assembly components. After the shell 22 is placed onto the assembly mandrel 50, twelve pre-assembled poles 32 (shown in FIG. 4) are disposed on top of the gasket 58, and in a generally cylindrical pattern between the shell 22 and the hub 52.

Referring to FIG. 4, one of the poles 32 is shown in more detail. The poles 32 preferably each include four components 39a, 39b, 39c and 39d. The four components 39a, 39b, 39c and 39d are assembled together to form a single tooth 24, stator wire 26 is then wrapped around the tooth 24 to form a stator coil 28, and epoxy resin 30 (shown in FIG. 2) is applied to encapsulate the stator coil 28 and retain the components 39a, 39b, 39c and 39d. Alternatively, varnish (not shown) may be applied to the stator coil 28 at this stage instead of the epoxy resin 30. It should be appreciated that the four components 39a, 39b, 39c and 39d include two generally identical end parts 39a and 39d, and two generally identical central parts 39b and 39c. Each pole 32 preferably defines a notch or groove 64. As the poles 32 are inserted between the shell 22 and the hub 52, the notches 64 align with a respective shell ridge 60. Therefore, the poles 32 are retained by the shell 22 in a radial direction so that the stator core 20 (shown in FIG. 2) does not rotate independently from the stator shell 22.

Still referring to FIG. 4, after all twelve pre-assembled poles 32 are positioned between the shell 22 and the hub 52, the retainers 36 are inserted between the poles 32 such that each retainer 36 is secured between the flanged end portions 34 of two adjacent poles 32. The retainers 36 are configured to seal a portion of the gap formed between adjacent poles 32 and thereby prevent oil (not shown) from leaking out of the cooling channels 38 (shown in FIG. 2). Alternatively, the retainers 36 may be replaced with a single or multi-component sleeve (not shown) disposed radially between the poles 32 and the hub 52. The second end ring 66 is then placed on top of the shell 22 and around the hub 52 such that the poles 32 are disposed axially between the first and second end rings 56, 66. The shell tabs 62 are bent radially inward to retain the stator assembly components. According to the preferred embodiment, the second end ring 66 defines an inlet nozzle 68 configured to engage a complementary feature (not shown) in the motor housing 12 (shown in FIG. 1) in order to facilitate the transfer of oil into the stator assembly 14 (shown in FIG. 2). After bending the shell tabs 62, the stator assembly 14 (shown in FIG. 2) is complete and may be removed from the assembly mandrel 50 (shown in FIG. 4) for installation into a vehicle.

Figure 5:
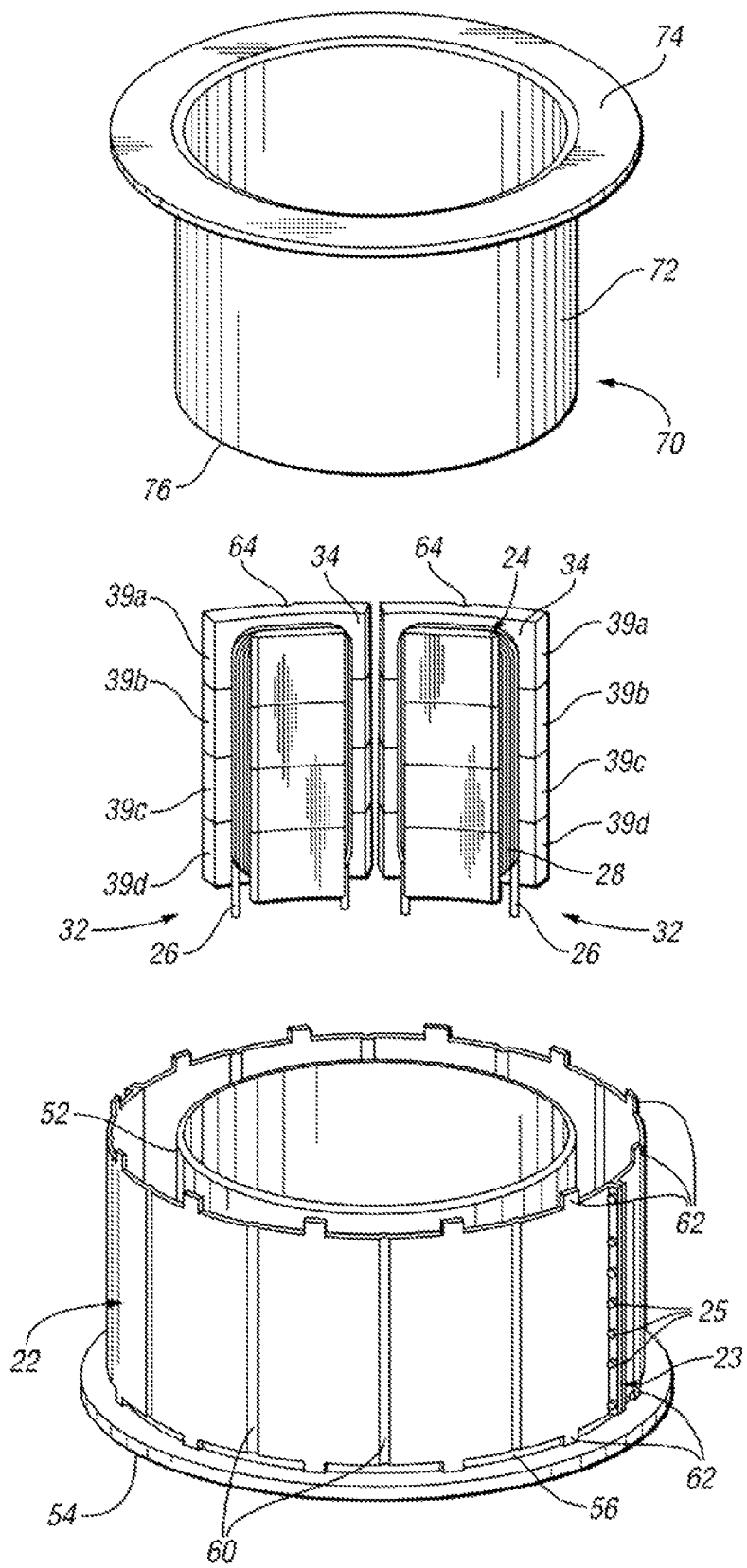
FIG. 5 is an exploded view illustrating a second sequence of steps in accordance with an alternate method for producing the stator assembly of FIG. 2.

With reference to FIG. 5, an alternate method for producing a stator assembly will now be described. According to the alternate embodiment of FIG. 5, the first end ring 56, the gasket 58 (shown in FIG. 3), the pre-assembled poles 32 and the shell 22 are assembled together on the assembly mandrel 50 (shown in FIG. 3) as previously described, and thereafter a sleeve 70 is installed. The sleeve 70 includes a generally cylindrical body 72 and a generally annular flange 74 circumscribing a terminal end portion of the body 72. The sleeve body 72 is configured to seal a gap defined between adjacent poles 32 and thereby replaces the retainers 36 (shown in FIG. 4). The sleeve flange 74 is configured to axially retain the poles 32 and thereby replaces the second end ring 66 (shown in FIG. 4). The sleeve 70 is installed such that the body 72 is disposed radially between the poles 32 and the hub 52, and the flange 74 covers the top of the poles 32. During sleeve 70 installation, an end portion 76 of the body 72 is passed through the inner diameter of the first end ring 56. The end portion 76 is configured to engage a complementary recess or feature (not shown) in the motor housing 12 (shown in FIG. 1) and thereby seal the interface between the body 72 and the housing 12. After the sleeve 70 is installed, the shell tabs 62 are bent radially inward to further retain the stator assembly components.

While the best modes for carrying out the invention have been described in detail, those familiar with the art to which this invention relates will recognize various alternative designs and embodiments for practicing the invention within the scope of the appended claims.

The invention claimed is:

1. A method for producing a stator assembly comprising:
providing an assembly mandrel having a generally cylindrical mandrel hub and a generally annular mandrel base circumscribing a terminal end portion of the mandrel hub;
installing a first end ring around the mandrel hub and onto the mandrel base;
installing a stator shell around the mandrel hub and onto the mandrel base;
disposing a plurality of poles on top of the first end ring and in a generally cylindrical pattern between the stator shell and the mandrel hub; and
installing a second end ring around the mandrel hub and on top of the plurality of poles.

2. The method of claim 1, further comprising disposing a gasket around the mandrel hub and on top of the first end ring before installing the stator shell, said gasket being configured to seal an interface between the first end ring and the plurality of poles.

3. The method of claim 2, further comprising pre-assembling the plurality of poles before disposing the plurality of poles on top of the gasket.

4. The method of claim 3, wherein said pre-assembling the plurality of poles includes assembling a plurality of pole components and wrapping the plurality of pole components with a wire to form a coil.

5. The method of claim 4, wherein said pre-assembling the plurality of poles includes applying epoxy to the coil.

6. The method of claim 4, wherein said pre-assembling the plurality of poles includes applying varnish to the coil.

7. The method of claim 1, further comprising disposing a plurality of retainers between said plurality of poles before installing the second end ring, said plurality of retainers being configured to seal the gap radially defined between adjacent poles.

8. The method of claim 1, further comprising bending a plurality of stator shell tabs in a radially inward direction after installing the second end ring such that the first and second end rings are axially retained by the bent stator shell tabs.

9. The method of claim 1, wherein said installing a stator shell includes assembling a first half and a second half of the stator shell such that a shell flange is defined at the interface therebetween, said shell flange being configured to resist the rotation of the stator assembly relative to a housing.

10. The method of claim 9, further comprising installing a fastener through the shell flange in order to retain the first half and second half of the stator shell.

\* \* \* \* \*